(12) United States Patent
Li et al.

(10) Patent No.: US 7,014,943 B2
(45) Date of Patent: Mar. 21, 2006

(54) THIN-FILM GAS DIFFUSION ELECTRODE AND THE METHOD FOR MAKING THE SAME

(75) Inventors: Wen-Chin Li, Hsinchu (TW);
Shu-Chin Chou, Hsinchu (TW);
Shinn-Horng Yeh, Hsinchu (TW);
Kuan-Liang Chen, Hsinchu (TW);
Kun-Lung Hsien, Hsinchu (TW);
Min-Lun Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 472 days.

(21) Appl. No.: 10/419,165

(22) Filed: Apr. 21, 2003

(65) Prior Publication Data

US 2004/0045833 A1    Mar. 11, 2004

(30) Foreign Application Priority Data

Sep. 9, 2002  (TW) ............................... 91120492 A

(51) Int. Cl.
*H01M 4/86* (2006.01)
(52) U.S. Cl. ............................. 429/41; 429/40; 429/42; 429/44; 29/623.5; 29/730; 29/746; 502/101; 204/283; 427/115
(58) Field of Classification Search ................ 502/101; 429/40, 41, 42, 44; 204/283; 29/623.5, 29/730, 746; 521/27; 427/115
See application file for complete search history.

(56) References Cited

U.S. PATENT DOCUMENTS

| | | | | |
|---|---|---|---|---|
| 5,536,379 | A * | 7/1996 | Nonaka et al. | 204/284 |
| 5,846,670 | A * | 12/1998 | Watanabe et al. | 429/42 |
| 6,042,958 | A * | 3/2000 | Denton et al. | 429/30 |
| 6,531,240 | B1 * | 3/2003 | Brown et al. | 429/44 |
| 2001/0036570 | A1 * | 11/2001 | Tosco et al. | 429/41 |
| 2003/0068544 | A1 * | 4/2003 | Cisar et al. | 429/40 |
| 2003/0104267 | A1 * | 6/2003 | Haridoss et al. | 429/44 |
| 2003/0118890 | A1 * | 6/2003 | Wittpahl et al. | 429/44 |
| 2004/0152588 | A1 * | 8/2004 | Janowitz et al. | 502/101 |
| 2004/0157101 | A1 * | 8/2004 | Smedley | 429/30 |

* cited by examiner

*Primary Examiner*—Bruce F. Bell
(74) *Attorney, Agent, or Firm*—Birch, Stewart, Kolasch & Birch, LLP

(57) ABSTRACT

This specification discloses a thin-film gas diffusion electrode (GDE) and the method for making the same. The thin-film GDE is formed in a unitary way. A dual-nature porous thin film is used as the substrate. A surface processing is performed to make one surface of the thing film hydrophlic while the other surface hydrophobic. The hydrophlic area serves as the active layer for electrochemical reactions after chemical processing. The hydrophobic area is kept dry to form a smooth gas channel, functioning as a gas diffusion layer. In this method, the thin-film GDE is free from the use of binders and high-temperature high-pressure manufacturing processes.

12 Claims, 4 Drawing Sheets

THIN-FILM GAS DIFFUSION ELECTRODE AND THE METHOD FOR MAKING THE SAME

BACKGROUND OF THE INVENTION

1. Field of Invention

The invention relates to a thin-film gas diffusion electrode (GDE) and the method for making the same. In particular, the invention relates to a thin-film GDE formed in a unitary way and the method there for making it.

2. Related Art

The gas diffusion electrode (GDE) plays an important role in chemical power sources. The GDE uses gas, such as hydrogen and oxygen, as the active material. Through the dissolving and diffusion steps, the gas active material has electrochemical reactions with the ions in the electrolyte to produce an electric current. The GDE using oxygen as the active material is called the air electrode. The combination of the oxygen GDE and the hydrogen GDE forms the main part of fuel cells.

In observation of the impacts on the environment due to the rapid population growth and industrial over-development, how to provide an environment-friendly business has become an important subject for all companies. The low-pollution fuel cells are seen as the most important energy source in the 21st century to provide a clean electric power. Such fuel cells can be widely used in electric cars, generators, and even the 3C products. The fuel cells produce electric power through electrochemical reactions but not burning. The hydrogen and oxygen react to produce electric currents, water and heat. There is almost no pollution at all.

The conventional GDE is mainly composed of three parts: a current collector, a gas diffusion layer, and an active layer. The current collector is responsible for electron transmissions. It is made of a good conductive metal. The gas diffusion layer provides a channel for gas to diffuse. It has to be kept completely dry, preventing the electrolyte from entering and blocking the diffusion channel. The active layer is the place to undergo a inhomogeneous electrochemical reactions. To accelerate the reaction speed, the active layer is often added with electrocatalysts.

The current GDE manufacturing technology is to make the above-mentioned three parts separately and combine them together afterwards. For the active layer, one first has to adsorb electrocatalysts directly onto a porous carbon substance and then add 5% to 15% of binder, which is usually a hydrophobic polytetrafluoroethylene (PTFE). They are homogeneously mixed and formed by rolling. For the gas diffusion layer, one mixes carbon powders and a high-concentration (15% to 25%) hydrophobic binder, usually hydrophobic PTFE, and performs formation by rolling. After finishing the active layer and the gas diffusion layer, they along with the current collect are combined to form a single GDE by hot-pressing. In this method, one needs to use a binder that may cause the following problems. First, during hot-pressing the binder experiences a temperature higher than its glass temperature. Therefore, it becomes mobile so that under pressure it often clogs the gaps and holes on the electrode. Therefore, larger gas channels in the gas diffusion layer are blocked, increasing the resistance of gas transportation. At the same time, the binder is likely cover the electrocatalysts disposed on the carbon powder surface on the active layer. The usage rate of the electrocatalysts and therefore the reaction rate are lowered. All the above effects significantly reduce the output power of the ensemble.

In addition, the conventional manufacturing method of the GDE inevitably requires the use of high-temperature and high-pressure processes. Each step of the temperature rising, lowering, and mold withdrawing results in limits on the production speed. The high-temperature and high-pressure processes also worry people with safety concerns.

SUMMARY OF THE INVENTION

In view of the foregoing, it is an objective of the invention to provide a thin-film gas diffusion electrode (GDE) and the method for making the same. The thin-film GDE is formed in a unitary way to avoid the use of a binder and hot-pressing. A porous thin film is used as the substrate. Both surfaces of the thin film are processed in different ways. One surface is a hydrophilic area, whereas the other is a hydrophobic area. The hydrophilic area is chemically processed to become an active layer for chemical reactions. The hydrophobic area is kept dry to form a smooth gas channel as the gas diffusion layer.

To achieve the above objective, the main body of the disclosed thin-film GDE has a hydrophobic area on one surface and a porous thin-film hydrophilic area on the other. The hydrophobic area is the gas diffusion layer for gas to pass through. The hydrophilic area is the active layer. In order for the active layer to be electrochemically active, the surface of the hydrophilic area has to be covered with an active substrate. Electrocatalysts are then deposited on the active substrate by a chemical or electrochemical method. This enables electrochemical reactions to be performed on the active layer with the hydrophilic property. Therefore, any place that the electrolyte can reach can undergo electrochemical reactions.

For such an innovative thin-film GDE formed in a unitary fashion, one has to employ an appropriate manufacturing method. First, both surfaces of a porous thin film are processed in different ways, so that one surface is a hydrophilic area and the other a hydrophobic area. This results in a dual-nature porous thin film. The hydrophilic area undergoes a wet chemical processing and is covered by an active substrate. Electrocatalysts that facilitate reactions are deposited on the active substrate so that the hydrophilic area of the porous thin film is electrochemically active. The porous thin film can be a polymer thin film. The technology of modifying the surface nature is pretty mature nowadays. One can perform different surface processes on a hydrophobic or hydrophilic porous thin film to obtain the same dual-nature porous thin film.

On the other hand, the method of covering the hydrophilic area with an active substrate by a wet chemical process can be achieved by using chemical plating to form a thin metal layer. An alternative method is to deposit a conductive polymer layer as the active substrate using a chemical method. The step of depositing electrocatalysts on the active substrate is achieved by self-assembly, electrophoretic deposition, or electrochemical deposition.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
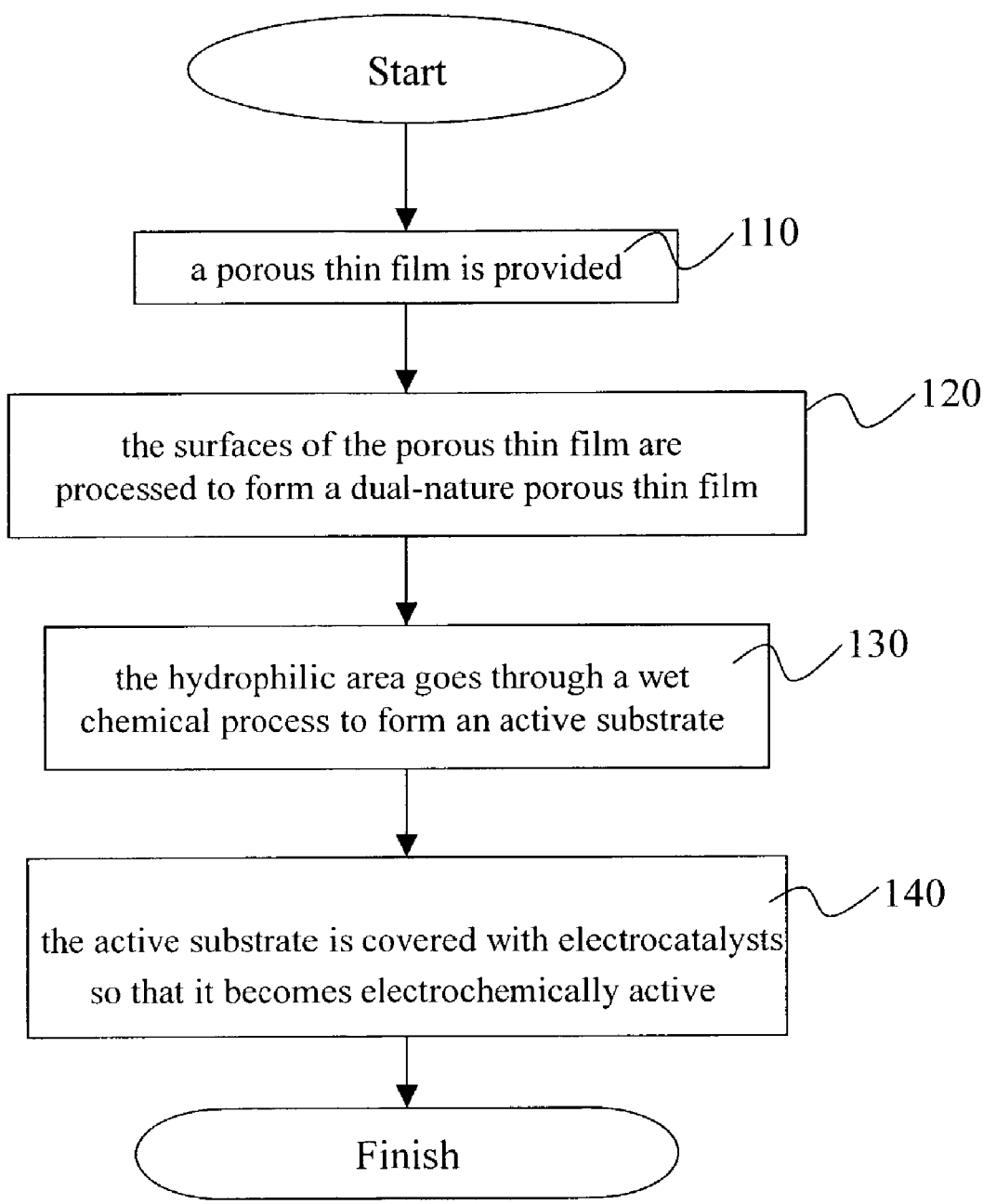
FIG. 1 is a flowchart of making the disclosed thin-film GDE.

To describe the invention in further detail, please refer to FIG. 1. First, a porous thin film is provided (step 110). The surfaces of the porous thin film are processed to form a dual-nature porous thin film (step 120). One surface of this dual-nature thin film is a hydrophilic area and the other a hydrophobic area. The hydrophilic area goes through a wet chemical process to form an active substrate (step 130). Finally, the active substrate is covered with electrocatalysts so that it becomes electrochemically active (step 140).

The porous thin film material can be selected from porous polymer thin films such as polyurethane (PU), polyethylene (PE), and polytetrofluoroethylene (PTFE) or carbon cloths. In the step of processing the surfaces of the porous thin film to form a dual-nature thin film, the surfaces of different materials have to be processed in different ways. For a hydrophobic porous polymer thin film (such as a PE film), one surface is protected by a special holding tool, whereas the other is exposed to a alkaline solution to perform a hydrophilic processing. One may also choose a hydrophilic porous polymer thin film. In this case, one surface is protected by a special holding tool, whereas the other is covered with a hydrophobic porous polymer thin film with a thickness over 0.05 mm. Either way can provide a dual-nature porous thin film.

In the step of performing wet chemical processing on the hydrophilic area to form an active substrate, the wet chemical processing is chemical plating. The hydrophilic area is metal-activated and then coated with an appropriate metal layer. Alternatively, the hydrophilic area is covered with a conductive polymer layer, such as the polypyrrole, in a chemical way as the active substrate.

Finally, the step of covering electrocatalysts on the active substrate so that it becomes electrochemically active can be achieved by the self-assembly distribution technology or the electrochemical deposition method. The self-assembly method is to add specific functional groups, such as the —SH and —COOH groups, to the surrounding substitute groups of macrocyclic compounds that can speed up reactions, such as CoTMPP and CoTPP, during the synthesis process. These functional groups are able to bond with specific metals (such as gold and aluminum). Afterwards, such macrocyclic compounds (the electrocatalysts) are distributed in an organic solution, such as acetone, dimethylformamide (DMF) or tetrahydrofuran (THF). The electrode substrate that uses a metal layer as its active substrate is also immersed into the organic solution, so that the electrocatalysts can automatically bond with the active substrate.

Figure 2:
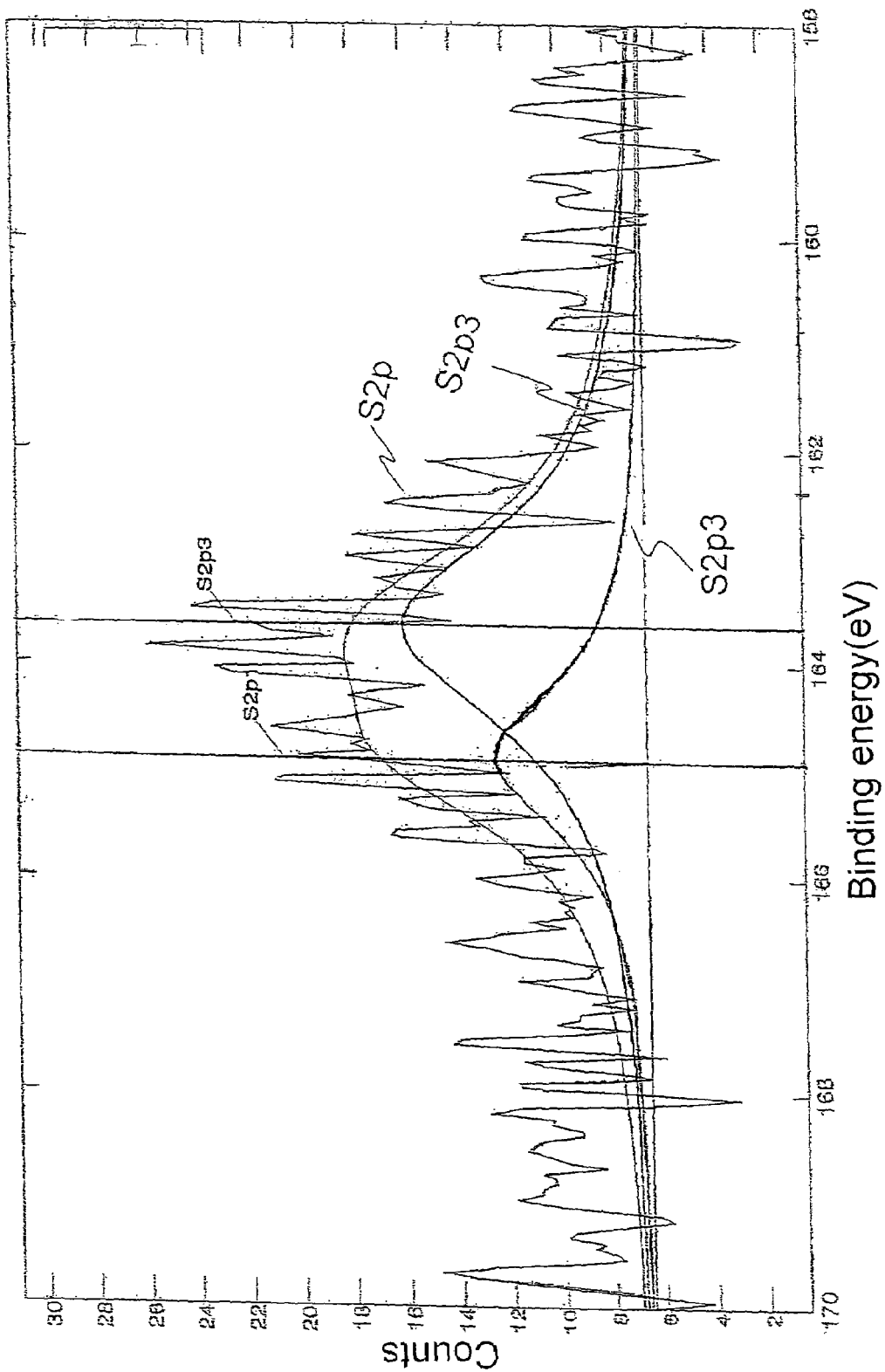
FIGS. 2 and 3 compare the binding energy of the sulfur element before and after electrocatalysts are bonded to the active substrate using the self-assembly method.
Figure 3:
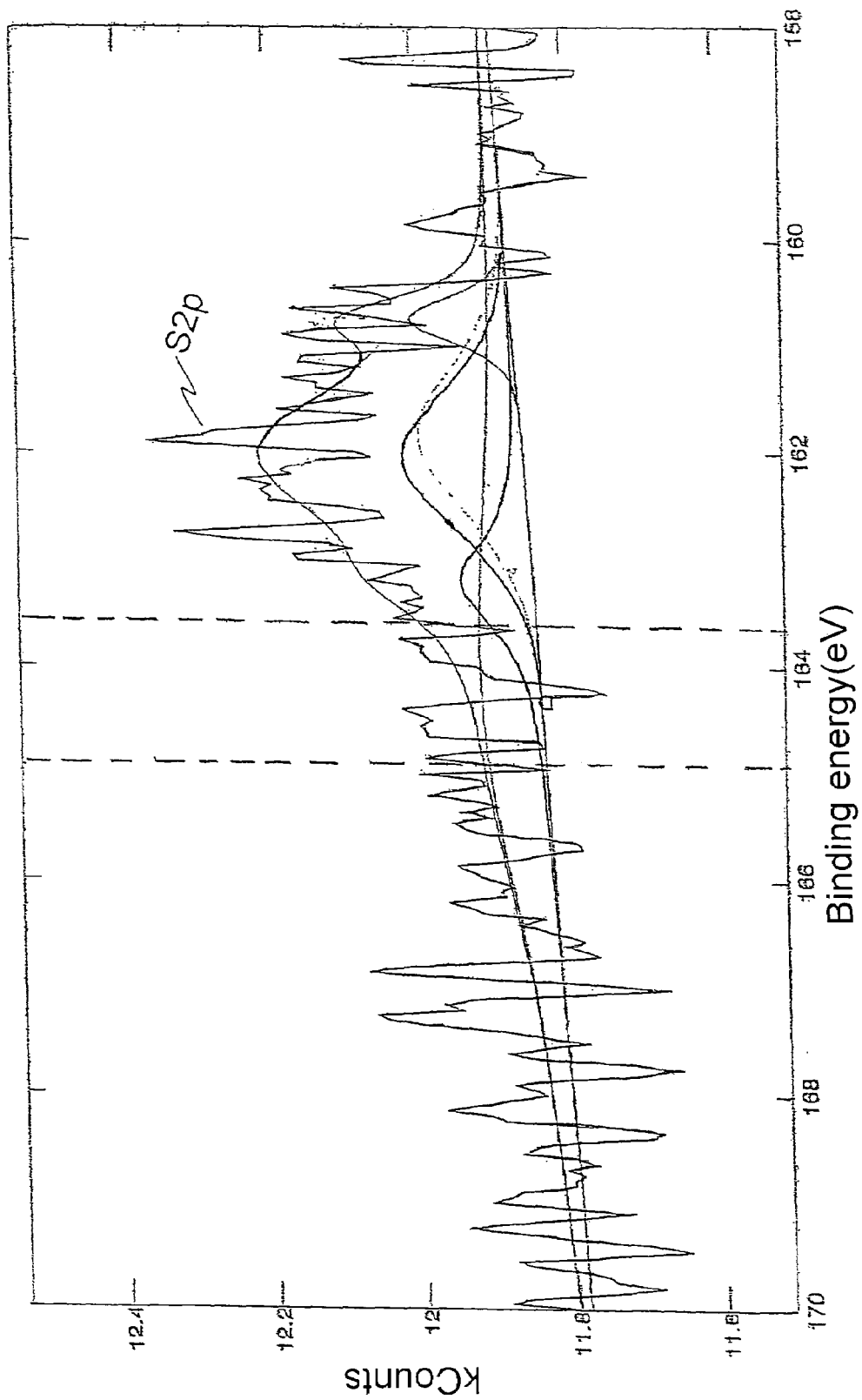

To prove the self-assembly behavior of electrocatalysts, refer to FIGS. 2 and 3 to compare the binding energy distribution of the sulfur element (S) before and after the electrocatalysts are bonded with the active substrate using the self-assembly method. This ensures that the self-assembly method is indeed able to bond the electrocatalysts with the metal active substrate. We employ the X-ray photoelectron spectroscopy (XPS) to detect the spectrum. The experimental details are as follows. An electrocatalysts with the S functional groups is dissolved into the THF, forming a 0.1 mM solution. A "wafer gold" is then used as the electrode substrate and immersed in the solution for 24 hours. The wafer gold is formed by first coating a silicon chip surface with a layer of 1500 Å thick TiW (to increase the adhesion of gold) and then a layer of 1000 Å thick gold. Afterwards, the immersed electrode is taken out and immersed in clean THF for 20 minutes. Finally, the electrode is washed to remove non-bonding electrocatalysts from its surface. This step guarantees that the electricatalyst with the S functional groups are combined to the electrode by bonding. The S element is bonded to the functional groups of the electrocatalysts molecules, as shown in FIG. 2. The two vertical lines at 165 eV and 163.6 eV represent the atomic binding energy of the S(2p1) and S(2p3) states, respectively. One sees from there that the binding energy of the S element after the electrocatalysts is bonded with the active substrate are shifted to the right, as shown in FIG. 3. The dashed lines in FIG. 3 indicate where the solid lines are in FIG. 2. This means that the electrocatalysts molecules automatically bond to the active substrate after the self-assembly.

If one uses the electrochemical deposition method to cover the electrocatalysts on the active substrate, a metal oxide or metal (such as ruthenium oxide, iridium oxide, $MnO_2$, NiO, Pt, Ag, etc) is directly grown on a metal substrate. One may also deposit nanometer powders of metal or metal oxide that can speed up chemical reactions on the metal substrate by electrophoretic deposition as the electrocatalysts. To prevent the deposited electrocatalysts from coming off the metal substrate, one may impose an appropriate thermal process to increase their adhesiveness.

In the following, we use an embodiment to explain the actual procedure of the invention. First, a 3 mm thick PU polymer film is placed in a special holding tool that only allows one surface to have reactions with the solution. The PU polymer film along with the holding tool is placed into a KOH solution to perform the hydrophilic processing. Afterwards, they are washed by de-ion water. The polymer film then goes through a electroless plating activating step. The activated polymer film is first coated with a thin layer of nickel in a electroless plating fashion and then put into immersion gold, allowing gold to replace nickel on the polymer film surface. The polymer is then left quietly for a period. A homogeneous gold-plated layer is thus formed as the active substrate. This method renders a dual-nature polymer film with an active substrate. Finally, the dual-nature polymer film is disposed into an organic solution distributed with electrocatalysts until the electrocatalysts are completely bonded with the gold-plated layer. One then obtains a thin-film GDE formed in a unitary method.

Figure 4:
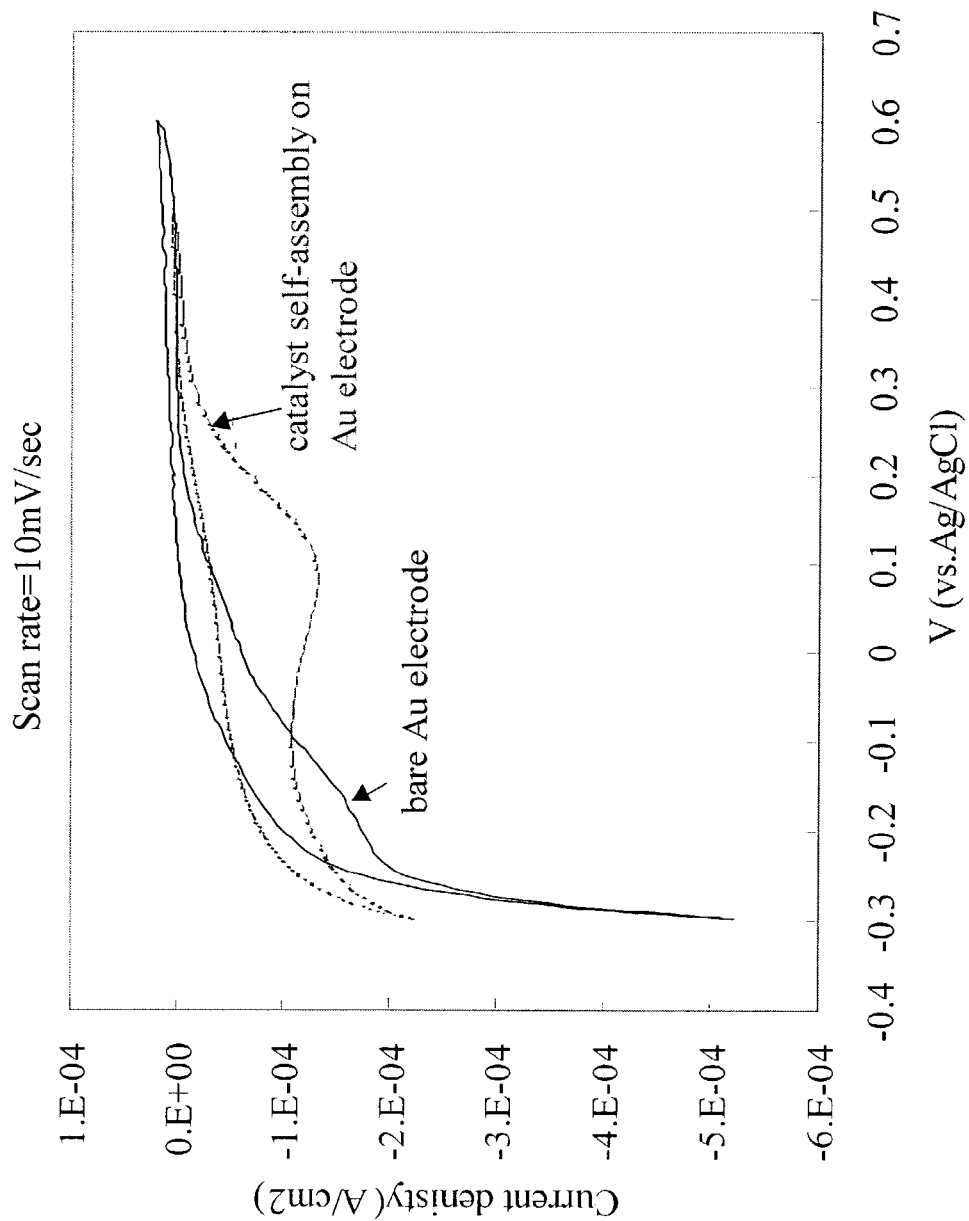
FIG. 4 is a CV analysis diagram of the active layer in the disclosed GDE before and after the electrocatalysts bonding.

For further explanation of the effects of the disclosed thin-film GDE, please refer to FIG. 4 that analyzes the voltage and current before and after the electrocatalysts bonding. The scan speed is 10 mV/s. The vertical axis indicates the current density in units of $A/cm^2$. The horizontal axis indicates the voltage in units of V. We employ the cyclic voltammetry (CV) to measure the oxidation and reduction reactions. The voltage is continuously changed to measure the corresponding current. As shown in FIG. 4, the blue contour represents the CV contour before the electrode and the electrocatalysts are bonded. The red contour represents the CV contour after the electrode and the electrocatalysts are bonded. Comparing these two contours, one sees that the disclosed thin-film GDE has more stable oxidation and reduction properties.

The invention discloses a new thin-film gas diffusion electrode structure and the method for preparing the same. It is completely free from the troubles of using binders and high-temperature high-pressure processes in the prior art. Aside from no worries about the safety concerns, most important of all, the invention does not need to use binders. This can increase the electrocatalysts usage rate and keep the gas transportation channel from being clogged or blocked. Moreover, due to its unitary formation, the electrode is very thin. This can reduce the weight and volume of the fuel cells. Because of its flexibility, the disclosed thin-film GDE can be widely used in cell designs of various kinds of shapes.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A gas diffusion electrode (GDE) comprising:
   a dual-nature porous thin film, which has a hydrophilic area on one surface and a hydrophobic area on the other, the hydrophobic area provides a gas diffusion channel for gas to pass through and the hydrophilic area is the place for electrochemical reactions; and
   an active substrate, which covers the surface of the hydrophilic area and is deposited with an electrocatalysts that speeds up the electrochemical reaction rate in the hydrophilic area.

2. The GDE of claim 1, wherein the material of the dual-nature porous thin film is selected from the group consisting of polyurethane (PU), polyethylene (PE), and polytetrofluoroethylene (PTFE), and carbon cloths.

3. The GDE of claim 1, wherein the active substrate is selected from a metal layer and a conductive polymer layer.

4. The GDE of claim 1, wherein the electrocatalysts is selected from the group consisting of ruthenium oxide, iridium oxide, $MnO_2$, NiO, Pt, and Ag.

5. The GDE of claim 1, wherein when the active substrate is a metal layer the electrocatalysts is a macrocyclic compound with special functional groups.

6. A method for making a gas diffusion electrode (GDE), which comprises the steps of:
   providing a dual-nature porous thin film, which has a hydrophilic area on one surface and a hydrophobic area on the other;
   performing a wet chemical process on the hydrophilic area to cover it with an active substrate; and
   depositing an electrocatalysts on the active substrate so that the active substrate becomes electrochemically active.

7. The method of claim 6, wherein the material of the dual-nature porous thin film is selected from the group consisting of polyurethane (PU), polyethylene (PE), and polytetrofluoroethylene (PTFE), and carbon cloths.

8. The method of claim 6, wherein the wet chemical process is to cover the hydrophilic area surface with an active substrate by chemical plating.

9. The method of claim 6, wherein the active substrate is selected from a metal layer and a conductive polymer layer.

10. The method of claim 6, wherein the electrocatalysts is selected from the group consisting of ruthenium oxide, iridium oxide, $MnO_2$, NiO, Pt, and Ag.

11. The method of claim 6, wherein when the active substrate is a metal layer the electrocatalysts is a macrocyclic compound with special functional groups.

12. The method of claim 6, wherein the step of depositing an electrocatalysts on the active substrate uses a method selected from the group consisting of the self-assembly method, the electrophoretic deposition, and the electrochemical deposition.

* * * * *